United States Patent
Rzyski (10) Patent No.: US 6,647,445 B2
(45) Date of Patent: Nov. 11, 2003

(54) DATA TRANSMISSION BY AN ALTERNATING FREQUENCY ANALOG SIGNAL

(76) Inventor: Eugene Rzyski, 3962 Acacia St., Irvine, CA (US) 92616

( * ) Notice: Subject to any disclaimer, the term of this patent is extended or adjusted under 35 U.S.C. 154(b) by 0 days.

(21) Appl. No.: 10/131,806

(22) Filed: Apr. 23, 2002

(65) Prior Publication Data

US 2002/0161949 A1 Oct. 31, 2002

Related U.S. Application Data

(63) Continuation of application No. 09/280,745, filed on Mar. 29, 1999, now Pat. No. 6,397,276.

(51) Int. Cl.⁷ ............................. G06F 1/08; G06F 13/14
(52) U.S. Cl. ............................. 710/62; 710/65; 710/68; 710/69; 360/40; 360/43; 348/572
(58) Field of Search .................. 710/65, 62, 68, 710/69; 348/572; 360/40, 43

(56) References Cited

U.S. PATENT DOCUMENTS

| | | | |
|---|---|---|---|
| 4,593,411 A | * | 6/1986 | Schiller ..................... 455/109 |
| 4,635,279 A | | 1/1987 | Nossen |
| 4,757,495 A | | 7/1988 | Decker et al. |
| 4,906,995 A | | 3/1990 | Swanson |
| 5,115,450 A | | 5/1992 | Arcuri |
| 5,136,618 A | | 8/1992 | Wright, Jr. |
| 5,184,229 A | | 2/1993 | Saito et al. |
| 5,426,665 A | | 6/1995 | Cleverly et al. |
| 5,517,433 A | * | 5/1996 | Morrison ..................... 708/3 |
| 5,661,718 A | | 8/1997 | Bremer et al. |
| 5,745,523 A | | 4/1998 | Dent et al. |
| 5,812,195 A | | 9/1998 | Zhang |
| 5,812,915 A | | 9/1998 | Farkash |
| 5,818,870 A | | 10/1998 | Yaguchi |
| 5,819,215 A | | 10/1998 | Dobson et al. |
| 5,845,243 A | | 12/1998 | Smart et al. |
| 5,852,520 A | | 12/1998 | Ido et al. |
| 5,909,186 A | | 6/1999 | Göohringer |
| 5,940,138 A | * | 8/1999 | Lowe .......................... 348/574 |
| 6,016,113 A | | 1/2000 | Binder |
| 6,061,008 A | | 5/2000 | Abbey |
| 6,075,474 A | | 6/2000 | Gabet et al. |
| 6,160,505 A | * | 12/2000 | Vaishampayan ............ 341/143 |
| 6,233,633 B1 | * | 5/2001 | Douma ........................ 710/69 |

* cited by examiner

*Primary Examiner*—Rehana Perveen
(74) *Attorney, Agent, or Firm*—MacPherson Kwok Chen & Heid LLP (57) ABSTRACT

The present invention provides for the compression of digital and analog data for storage and transmission. Analog data in the form of an analog signal is converted into a digital signal by an analog-to-digital converter. The digital signal is then converted into an analog signal having an alternating frequency by a first converter processor and an alternating frequency generator according to a predetermined conversion table. To reproduce the original analog signal, the analog signal having an alternating frequency is first converted back into a digital signal by an alternating frequency measurement means connected to a second converter processor, also in accordance with the predetermined conversion table. The digital signal is then converted to the original analog signal by a digital-to-analog converter.

12 Claims, 3 Drawing Sheets

DATA TRANSMISSION BY AN ALTERNATING FREQUENCY ANALOG SIGNAL

This application is a continuation of Ser. No. 09/280,745 filed Mar. 29, 1999 now U.S. Pat. No. 6,397,276.

BACKGROUND OF THE INVENTION

The present invention relates generally to a system and method for data communication and storage. More particularly, the present invention relates to both lossless and lossy compression techniques to concentrate relevant signal information for data communication and storage.

There are a variety of techniques for the compression of data which may be stored digitally or by analog techniques. This data represents audio, visual or other information for which there are numerous and different constraints to their compression.

Computer data files are, with few exceptions, stored digitally. The inherent advantages of digital communication and storage techniques are primarily due to the fact that information which is transmitted and stored in a binary form is much less susceptible to corruption due to noise or distortion than conventional analog systems. In addition, the conversion of analog signals to a digital form enables the user to employ noise reduction techniques and advanced signal processing algorithms which cannot typically be conducted on conventional analog signals. Moreover, digital communication and storage can also provide exact reproduction of the system output signals.

This is important because computer files must retain all of their information during storage or transmission, as an error of even one bit can totally corrupt the file. Corruption of a computer file can result in either failure of the entire computer system, or in the case of corruption of a non-operating file, such as a word processing file, inability to recreate the exact copy of the original file. Accordingly, the storage or transmission of computer data files or the like require highly reliable systems which maintain file integrity. Moreover, any compression of a computer file must be lossless, meaning not result in the loss of any data and provide exact reproduction of the uncompressed data.

Unfortunately, digital transmission and storage techniques disadvantageously require much wider frequency bandwidth. This is particularly true with respect to video information and modern multimedia systems which require the processing and storage of high volumes of data. Moreover, the transmission of video must often be accomplished in real time wherein the video information is transmitted at the same rate or faster than video playback.

To illustrate the complexity of the problem, each channel of the Common Interface Format (CIF) resolution standard for video systems requires 352 pixels per line and 288 lines per frame. In addition, CIF requires 2 chrominace channels with half resolution of 176 pixels per line, 146 lines per frame and 8 bits per pixel. With full motion video requiring approximately 30 frames per second transmission rate, video transmission requires approximately 36 Mbit per second. By means of an example, using a 56.6 k bits per second modem, it would take almost 11 minutes to transmit 1 second of video data over a telephone line. As a separate example, a CD-ROM having a capacity of 650 megabytes can only store approximately 18 seconds of uncompressed (CIF) video data.

Present systems do not provide adequate transmission rate of video signals over available communication channels. Presently, the most popular and inexpensive means for transmission of digital data is through the public telephone network. Unfortunately, the public telephone network was designed to transmit analog signals in a voice frequency range which is significantly lower than the frequency range required for most present day communication systems including digital data, voice and video communication.

To transmit digital information over the public telephone network, one typically uses a modem. Digital information is converted to an analog form. The modem filters the digital signal by shifting the signal and frequency to form a band limited signal. The modem then modulates that signal within the bandwidth of the communications channel which is typically between 300 Hz and 3500 Hz. Present modems employ quadrature modulation to increase the transmission rate of the digital information. Unfortunately, quadrature modulation has only increased present modem speed to approximately 56,600 bits per second. Accordingly, for practical digital transmission or storage, it is necessary to reduce the amounts of data to be transmitted or stored by either eliminating redundant information or by reducing the quality of the information.

As opposed to lossless compression techniques, data that is ultimately observed by the human senses can often be compressed with the loss of some information without any discernable alteration, as the human senses have limited capabilities in perception. Accordingly, audio and visual information is often compressed by lossy methods, for which there is a loss of information, since it is only necessary to recreate (decompress) a signal to the degree required for a subjective quality level rather then to perfectly recreate the signal.

For example, U.S. Pat. No. 5,819,215 issued to Dobson, U.S. Pat. No. 5,812,915 issued to Zhang and U.S. Pat. No. 5,845,243 issued to Smart each disclose lossy compression methods. U.S. Pat. Nos. 5,819,215 and 5,845,243 teach a wavelet based compression method having an adaptive bit rate control. An analog signal is digitally sampled at a desired rate and samples are transformed into the wavelet domain to form wavelet coefficients. The data is then compressed by reducing the total number of coefficients to be saved.

U.S. Pat. No. 5,812,195 teaches compressing video by using a prediction video signal to predict image blocks of a video image. An error measurement is obtained from comparing the predicted image to the actual image.

U.S. Pat. No. 5,426,665 issued to Cleverley et al. discloses a compression technique for spread spectrum communication systems. For spread spectrum communication systems or radar pulse compression systems, data is mixed with a pseudo random code with the frequency alternated during radio transmission. In a receiver, the process is reversed with the received signal down converted and then decoded to extract the data.

U.S. Pat. No. 5,184,229 issued to Saito et al. discloses a data compression system utilizing Huffman coded data.

Meanwhile, U.S. Pat. No. 5,818,870 issued to Yaguchi discloses transmitting an analog signal through a digital communication device. The amplitude to the signal is modulated to provide analog information, while the frequency is maintained at the normal rate of the digital communication device.

U.S. Pat. No. 5,661,718 issued to Bremer et al. discloses the simultaneous transmission of analog and digital communications. A sampled analog signal can be quantisized and represented in digital form. The analog signal which is then converted to digital form is then converted to amplitude quantisized pulse amplitude modulated format, such as conventional PCM.

Unfortunately, in such prior art compression techniques, the data transmission rates are still too slow for many practical applications. In addition, amplitude modulation of a transmitted signal often suffers from signal-to-noise ratio (S/N) problems. Moreover, it would be advantageous to provide a compression system and apparatus which did not result in the loss of any information during storage or transmission.

SUMMARY OF THE PRESENT INVENTION

Briefly, in accordance with the invention, I provide an improved apparatus and method for compressing digital data by converting the digital data to an analog signal. Generally, it is thought that information, stored in digital or in analog format, can be more quickly or more efficiently transmitted by digital processing than by known analog methods. Contrary to past teachings, I have discovered that digital information can be more quickly or efficiently transmitted if first translated into an analog format.

Digital data is comprised of "bits" in the form of "ones" and "zeros". For example, applying traditional digital techniques, a signal transmitted at 3000 Hz provides the opportunity to transmit 3000 individual bits in one second. These individual ones and/or zeros are then complied in discreet packages called "words". For example, typically an 8 bit processor compiles and processes 8 bit words, and converts those words into usable information.

My invention provides for converting the digital data into an analog signal for storage or transmission. The digital data is first separated into digital words. Each digital word, including for example 8 bits, is then assigned a preselected frequency assignment according to a predetermined conversion table. An analog signal is then created having an alternating frequency with the frequency alternating every predetermined number of cycles. The alternating frequencies of the analog signal are assigned by sequentially arranging the preselected frequency assignments corresponding to the digital words. More particularly, the analog signal is modulated in frequency every predetermined number of cycles with each frequency corresponding to a preselected frequency assignment and each frequency assignment defining a digital word.

This method should not be confused with standard frequency modulation (FM), which it is not. A typical FM signal is modulated from a single defined frequency assignment according to the information, such as sound, being stored or transmitted. In contrast, according to the present invention, the analog signal is not modulated from a single frequency. Instead, like Code Diversion Multiple Access (CDMA), the alternating frequency (hereinafter "AF") analog signal includes a plurality of alternating frequency assignments. However, unlike CDMA it is the particular frequency assignment which provides information corresponding to the original digital data.

For example only, according to an embodiment of the present invention, a system having a maximum frequency rate of 4000 Hz is formatted to include eight (8) frequency assignments between 2250 Hz and 4000 Hz, with each frequency assignment having a bandwidth of 250 Hz. Digital data is separated into 3 bit words and each word is assigned a particular frequency assignment, for example, according to the following conversion table.

| Digital Word | Frequency Assignment (Hz) |
|---|---|
| 000 | 2250 |
| 001 | 2500 |
| 010 | 2750 |
| 011 | 3000 |
| 100 | 3250 |
| 101 | 3500 |
| 110 | 3750 |
| 111 | 4000 |

A digital stream, such as 010101000110 . . . , is broken into individual 3 bit words, such as 010, 101, 000 and 110. An AF analog signal is then generated with the analog signal modulated in frequency every predetermined number of cycles with each frequency corresponding to preselected frequency assignments and each frequency assignment defining a digital word according to the conversion table. For example, an AF analog signal alternating every one (1) cycle based on the above digital stream and above conversion table would include a first cycle at 2750 Hz (corresponding to "010"), a second cycle at 3500 Hz (corresponding to "101"), a third cycle at 2250 Hz (corresponding to "000"), and a fourth cycle at 3750 Hz (corresponding to "110"). In this manner twelve (12) digital bits can be transmitted in four cycles of the analog signal at an average frequency of approximately 3000 Hz, instead of transmitting four (4) digital bits in four cycles for an analog signal having a frequency of 4000 Hz.

The AF analog signal is then transmitted or stored by means known to those skilled in the art. For example, the AF analog signal may be stored by magnetic tape, or transmitted such as by wire, fiberoptics, RF transmission, or the like.

To decompress the AF analog signal and reproduce the original digital data, the AF analog signal is processed with the alternating frequencies of the analog signal being measured. The alternating frequencies are, in turn, converted back into digital words according to the predetermined conversion table, and the digital words are sequentially arranged to produce a digital data stream. The digital data stream is a reproduction of original data that was first converted into an AF analog signal.

In preferred embodiments, digital data is further compressed by reducing the bandwidth between frequency assignments, by altering the predetermined number of cycles before the analog signal is alternated in frequency, and by increasing the number of digital bits which correspond to each word. For example, in a preferred embodiment, a much greater data transmission rate is achieved by alternating the frequency assignments every half signal cycle instead of every signal cycle. In addition, with reference to the above example, a greater data transmission rate can be achieved by reducing the frequency bandwidth between frequency assignments from 250 Hz to 125 Hz, or even 50 Hz, thereby raising the average frequency rate.

In an additional preferred embodiment, the conversion tables are created such that the more frequently used digital words correspond to frequency assignments having shorter wavelengths. For example, the digital word used most often in a particular system, or during a particular application, is assigned a frequency assignment having the highest frequency. The predominance of digital words having shorter wavelengths will further increase the data transmission rate. In an additional preferred embodiment, the digital data is sampled, or analyzed in its entirety, by the first convertor processor. The first converter processor then selects, or creates, a conversion table wherein the predominantly used digital words are assigned to frequency assignments having the greatest frequency. In this manner, the AF analog signal will have a comparatively higher average frequency for the system, and comparatively greater data transmission rate.

As would be understood by those skilled in the art, the present invention provides for encryption of data. Further encryption of the AF analog signal can also be simply accomplished by using proprietary conversion tables. Moreover, as long as the same conversion table is used for encoding and decoding, the conversion tables can be changed or modified to provide a high degree of protection which can be accomplished by using multiple conversion tables.

Where the measurement means for measuring the frequency assignments of the analog signal is not very precise, it is preferred that the predetermined number of cycles is increased before the analog signal is alternated in frequency. For example, the predetermined number of cycles may be increased to 10, or even 100 cycles, to permit the frequency measurement means to make a substantial number of frequency measurements of the analog signal to provide an extremely accurate and verified determination of an alternating frequency before measuring the frequency corresponding to the next digital word.

Though the present invention has been explained with reference to the compression of digital data, analog data may also by compressed by application of the present invention. Analog data is first converted into digital data by means know to those skilled in the art, for example by an analog-to-digital converter. The digital data is then converted into an AF analog signal having alternating frequencies, as explained above. To decompress the AF analog signal and convert the signal back into the analog data's original format, the AF analog signal is first converted into digital data, also by means explained above. The digital data is then processed through a digital-to-analog converter known to those skilled in the art, to reproduce the original analog data.

It is thus an object of the present invention to provide new and improved apparatus and methods for compressing analog and digital data.

It is another object of the present invention to provide loss less apparatus and methods for transmitting and storing compressed analog and digital data.

It is still another object of the present invention to provide apparatus and methods providing for the transmission of data over bandlimited transmission medium such as standard public telephone lines.

It is an additional object of the present invention to provide full-motion video communication over bandlimited transmission medium such as standard analog telephone lines.

DETAILED DESCRIPTION OF THE INVENTION

While the present invention is susceptible of embodiment in various forms, there is shown in the drawings and will hereinafter be described the presently preferred embodiments of the invention with the understanding that the present disclosure is to be considered as an exemplification of the invention and is not intended to limit the invention to the specific embodiments illustrated.

Figure 1:
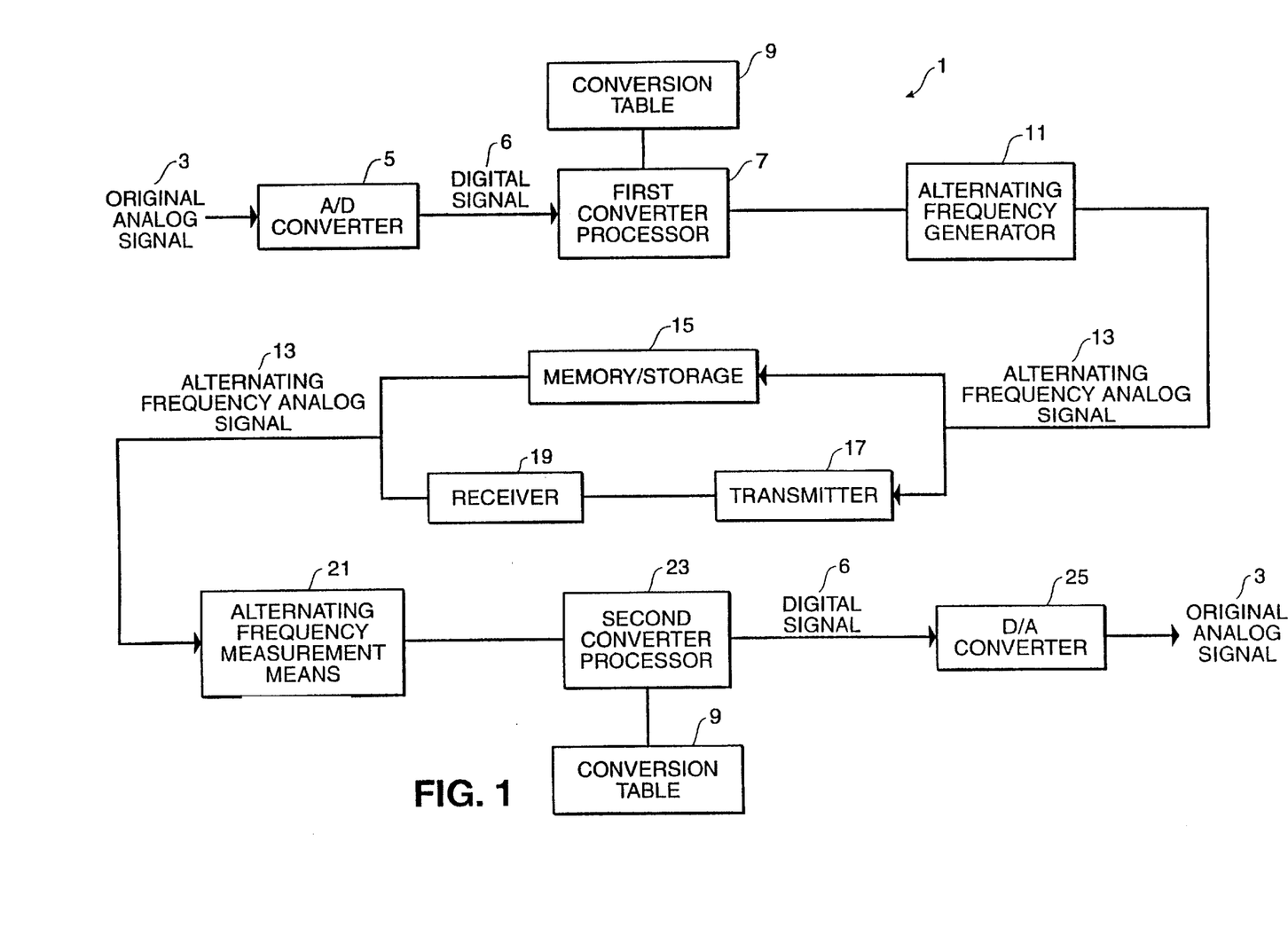
FIG. 1 is a block diagram illustrating apparatus and methods for the compression of analog and digital data of the present invention.

The present invention provides for methods and apparatus for compressing data for storage or transmission. Referring to FIG. 1, the system for compressing data 1 includes a first converter processor 7. The first converter processor 7 comprises a digital signal processor for processing input digital data in the form of a digital signal 6. The first converter processor 7 is operationally connected to a conversion table 9 and an alternating frequency generator 11. In operation, the first converter processor 7 receives input digital signal 6 and separates the digital data into sequential digital words. The first converter processor 7 then assigns each digital word a preselected frequency assignment according to the conversion table 9. The conversion table 9 is a look-up table which assigns a preselected frequency assignment to each digital word received by the first converter processor 7. Based on the conversion of the digital signal first into digital words and then into preselected frequency assignments, the alternating frequency generator 11 creates an analog signal 13 having an alternating frequency.

Figure 2:
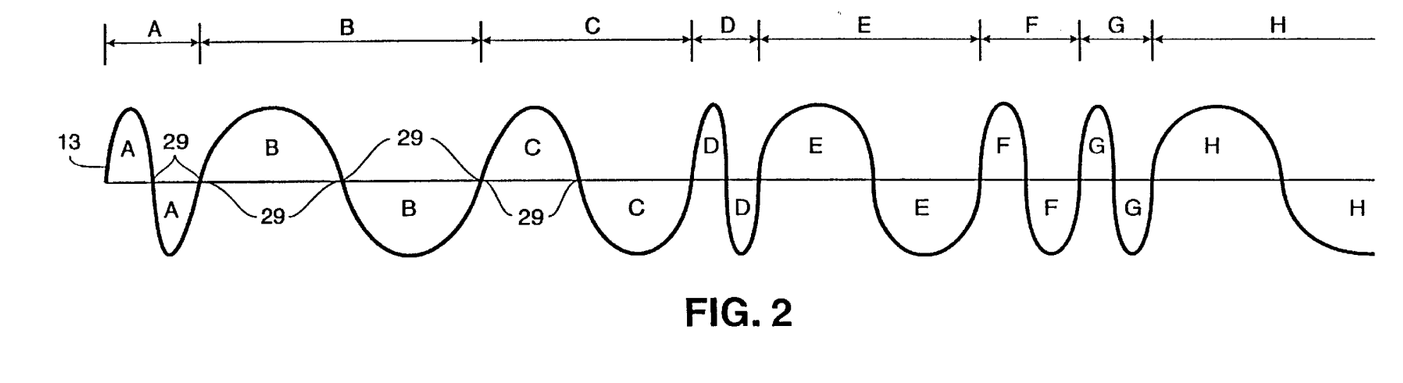
FIG. 2 is a graphical depiction of an AF analog signal created by application of the present invention in which the frequency of the analog signal alternates every cycle of its sinusoidal wave.
Figure 3:
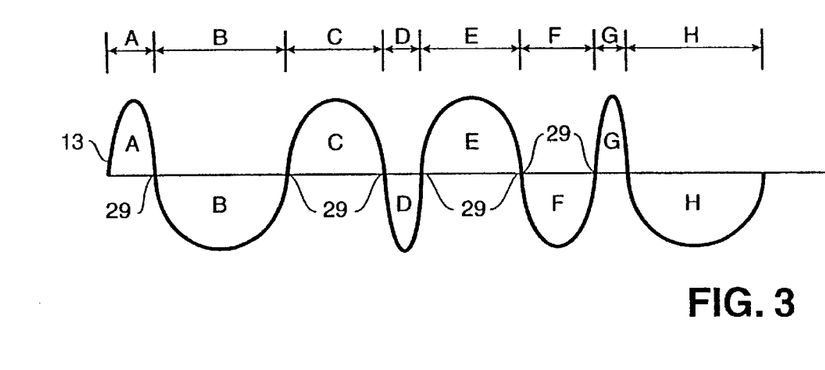
FIG. 3 is an additional graphical depiction of an AF analog signal created by application of the present invention in which the frequency of the analog signal alternates every half-cycle of its sinusoidal wave.

As shown in FIGS. 2 and 3, the alternating frequency (AF) analog signal 13 is a sinusoidal analog signal which is alternated in frequency every predetermined number of sinusoidal cycles. As shown in FIG. 2, in a preferred embodiment, the analog signal 13 alternates in frequency every cycle of its sinusoidal wave. In an even more preferred embodiment, the AF analog signal 13 alternates in frequency every half cycle of its sinusoidal wave as shown in FIG. 3. The alternating frequencies of the AF analog signal 13 are sequentially defined by the preselected frequency assignments created by the first converter processor 7 in accordance with conversion table 9. In other words, digital data 6 is converted to an AF analog signal 13 which contains the digital data 6 encoded by the first converter processor 7 in accordance with the conversion table 9.

The AF analog signal 13 may then be transmitted or stored. For example, the AF analog signal 13 may be stored by magnetic tape, or converted back to a digital format for storage as known by those skilled in the art. Moreover, the AF analog signal may be transmitted by wire, fiberoptics or RF transmission. As will be explained in greater detail below, it is believed that the apparatus and method for compressing data of the present invention is particularly useful for transmitting video imagery by public telephone lines or by presently existing analog-based cellular telephone systems.

To decompress the AF analog signal 13, the system includes an alternating frequency measurement means 21 and a second converter processor 23 connected to a conversion table 9. In reverse fashion to compressing the original digital signal 6, the alternating frequency measurements means 21 measures the frequency of the AF analog signal 13 as it is received. The alternating frequencies are then converted by the second converter processor 23 into digital words in accordance with the conversion table 9. The digital words are then sequentially arranged by the converter processor 23 to produce a digital data stream 6 without any loss of data as originally received by the first converter processor 7.

It is believed that the measurement of the alternating frequencies maybe accomplished by several techniques known to those skilled in the art. For example, the alternating frequencies of the AF analog signal 13 can be determined by use of an upcounter method, a frequency translator, the frequency counter method and a time interval analyzer. With reference to FIGS. 2 and 3, each of these techniques utilize a comparator which identifies the interception point 29 where the sine wave of the AF analog signal 13 travels from positive to negative or negative to positive as graphically depicted for a sinusoidal wave. These interception points 29 are combined with highly accurate clocks or counters to provide accurate determinations of the alternating frequencies. For example, the upcounter method utilizes an oscillator which is triggered to start by the comparator at the zero crossing interception point 29. At the next interception point, the comparator stops the oscillator. A frequency calculation can then be made based on counters connected to the oscillator. Similarly, a time interval analyzer utilizes a highly accurate clock which is started and stopped by the comparator's determination of the interception points 29. Clock measurements are then readily translated into frequency measurements by simple inversion.

Figure 4:
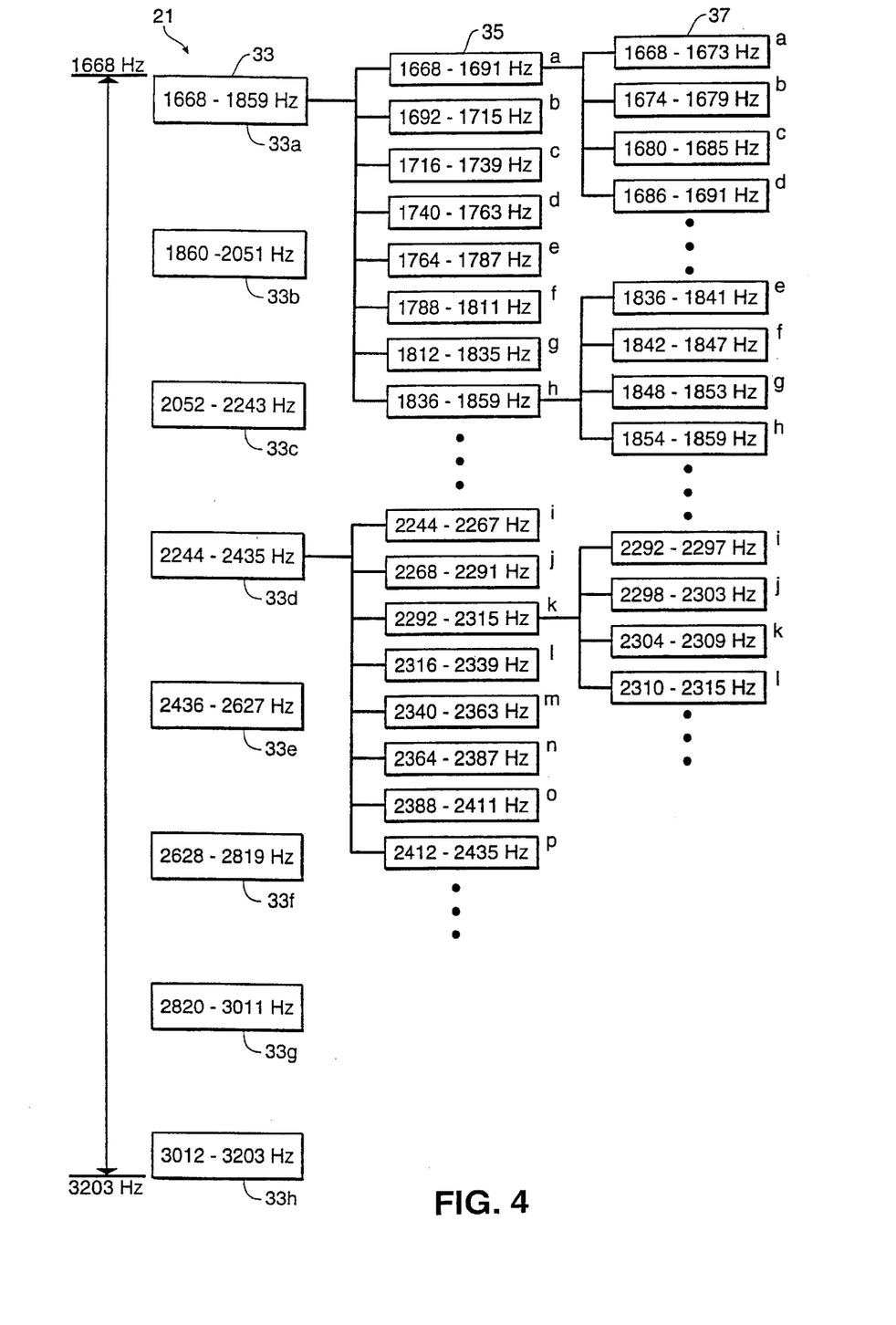
FIG. 4 is a block diagram illustrating the alternating frequency measurement means of the present invention including Finite Infinite Response (FIR) filters.

In a preferred embodiment of the invention, the alternating frequency measurement means 21 includes a series of Digital Signal Processing (DSP) chips in the form of Finite Impulse Response (FIR) filters. FIR filters adaptable for application with the present invention are commercially obtainable from Harris Semiconductors, Inc. The FIR filters operate as bandpass filters permitting the portion of the analog signal, specifically the predetermined number cycles of the AF analog signal 13 having a particular frequency, to pass only through the FIR filter defined by a particular bandwidth. As shown in FIG. 4, the FIR filters are arranged in a series of filter banks, 35, 37 and 39. Each filter bank, in turn, includes a plurality of FIR filters 35a–h, 37a–p, and 39a–l, respectively. With reference also to FIG. 1, an AF analog signal 13 received by the alternating frequency measurement means 21 is routed through the series of filter banks containing the plurality of FIR filters. As shown, the first filter bank 35 contains eight (8) FIR filters 35a–h. The first filter bank 35 receives the AF analog signal 13 and routes the predetermined number cycles of the AF analog signal 13 only through the FIR filter defined by the frequency of that portion of the analog signal. After passing the first filter bank 35, the AF analog signal 13 is routed through a second filter bank 37 comprising additional bandpass FIR filters 37a–p, with each FIR filter having a narrower frequency bandpass bandwidth than the FIR filters in the preceding filter bank. The AF analog signal 13 is routed through successive filter banks until the bandpass bandwidth of the FIR filter is sufficiently narrow to accurately measure the frequency of the predetermined number cycles of the AF analog signal 13 to identify the corresponding digital words of the original digital signal 6.

In an additional preferred embodiment, the system is particularly configured for transmission of data over the public telephone network having a maximum typical frequency transmission rate of approximately 3200 Hz. For the sake of simplifying the present description of the invention, it is assumed that the alternating frequency measurement means 21 can accurately measure the frequencies of the AF analog signal 13 for every cycle of the sinusoidal wave with a bandwidth separation of 6 Hz. However, it is believed that employing presently known methods and apparatus, that those skilled in the art can accurately reduce this bandwidth separation and conduct sampling every half cycle to further compress the transmission-of information over the public telephone network. Assuming the transmission of 8 bit digital words down the telephone line, 256 frequency assignments are needed. Shown below is a presently preferred conversion table 9 assigning frequency assignments to digital words.

Digital Word - Frequency Assignment Table 1670–3200 Hz

| Decimal # Frequency | Binary Word | Frequency (Hz) |
| --- | --- | --- |
| 0 | 00000000 | 1670 |
| 1 | 00000001 | 1676 |
| 2 | 00000010 | 1682 |
| 3 | 00000011 | 1688 |
| 4 | 00000100 | 1694 |
| 5 | 00000101 | 1700 |
| 6 | 00000110 | 1706 |
| 7 | 00000111 | 1712 |
| 8 | 00001000 | 1718 |
| 9 | 00001001 | 1724 |
| 10 | 00001010 | 1730 |
| 11 | 00001011 | 1736 |
| 12 | 00001100 | 1742 |
| 13 | 00001101 | 1748 |
| 14 | 00001110 | 1754 |
| 15 | 00001111 | 1760 |
| 16 | 00010000 | 1766 |
| 17 | 00010001 | 1772 |
| 18 | 00010010 | 1778 |
| 19 | 00010011 | 1784 |
| 20 | 00010100 | 1790 |
| 21 | 00010101 | 1796 |
| 22 | 00010110 | 1802 |
| 23 | 00010111 | 1808 |
| 24 | 00011000 | 1814 |
| 25 | 00011001 | 1820 |
| 26 | 00011010 | 1826 |
| 27 | 00011011 | 1832 |
| 28 | 00011100 | 1838 |
| 29 | 00011101 | 1844 |
| 30 | 00011110 | 1850 |
| 31 | 00011111 | 1856 |
| 32 | 00100000 | 1862 |
| 33 | 00100001 | 1868 |
| 34 | 00100010 | 1874 |
| 35 | 00100011 | 1880 |
| 36 | 00100100 | 1886 |
| 37 | 00100101 | 1892 |
| 38 | 00100110 | 1898 |
| 39 | 00100111 | 1904 |
| 40 | 00101000 | 1910 |
| 41 | 00101001 | 1916 |
| 42 | 00101010 | 1922 |
| 43 | 00101011 | 1928 |
| 44 | 00101100 | 1934 |
| 45 | 00101101 | 1940 |
| 46 | 00101110 | 1946 |
| 47 | 00101111 | 1952 |
| 48 | 00110000 | 1958 |
| 49 | 00110001 | 1964 |
| 50 | 00110010 | 1970 |
| 51 | 00110011 | 1976 |
| 52 | 00110100 | 1982 |
| 53 | 00110101 | 1988 |
| 54 | 00110110 | 1994 |
| 55 | 00110111 | 2000 |
| 56 | 00111000 | 2006 |
| 57 | 00111001 | 2012 |
| 58 | 00111010 | 2018 |
| 59 | 00111011 | 2024 |

Digital Word - Frequency Assignment Table 1670–3200 Hz

| Decimal # Frequency | Binary Word | Frequency (Hz) |
|---|---|---|
| 60 | 00111100 | 2030 |
| 61 | 00111101 | 2036 |
| 62 | 00111110 | 2042 |
| 63 | 00111111 | 2048 |
| 64 | 01000000 | 2054 |
| 65 | 01000001 | 2060 |
| 66 | 01000010 | 2066 |
| 67 | 01000011 | 2072 |
| 68 | 01000100 | 2078 |
| 69 | 01000101 | 2084 |
| 70 | 01000110 | 2090 |
| 71 | 01000111 | 2096 |
| 72 | 01001000 | 2102 |
| 73 | 01001001 | 2108 |
| 74 | 01001010 | 2114 |
| 75 | 01001011 | 2120 |
| 76 | 01001100 | 2126 |
| 77 | 01001101 | 2132 |
| 78 | 01001110 | 2138 |
| 79 | 01001111 | 2144 |
| 80 | 01010000 | 2150 |
| 81 | 01010001 | 2156 |
| 82 | 01010010 | 2162 |
| 83 | 01010011 | 2168 |
| 84 | 01010100 | 2174 |
| 85 | 01010101 | 2180 |
| 86 | 01010110 | 2186 |
| 87 | 01010111 | 2192 |
| 88 | 01011000 | 2198 |
| 89 | 01011001 | 2204 |
| 90 | 01011010 | 2210 |
| 91 | 01011011 | 2216 |
| 92 | 01011100 | 2222 |
| 93 | 01011101 | 2228 |
| 94 | 01011110 | 2234 |
| 95 | 01011111 | 2240 |

Digital Word - Frequency Assignment Table 1670–3200 Hz

| Decimal # Frequency | Binary Word | Frequency (Hz) |
|---|---|---|
| 96 | 01100000 | 2246 |
| 97 | 01100001 | 2252 |
| 98 | 01100010 | 2258 |
| 99 | 01100011 | 2264 |
| 100 | 01100100 | 2270 |
| 101 | 01100101 | 2276 |
| 102 | 01100110 | 2282 |
| 103 | 01100111 | 2288 |
| 104 | 01101000 | 2294 |
| 105 | 01101001 | 2300 |
| 106 | 01101010 | 2306 |
| 107 | 01101011 | 2312 |
| 108 | 01101100 | 2318 |
| 109 | 01101101 | 2324 |
| 110 | 01101110 | 2330 |
| 111 | 01101111 | 2336 |
| 112 | 01110000 | 2342 |
| 113 | 01110001 | 2348 |
| 114 | 01110010 | 2354 |
| 115 | 01110011 | 2360 |
| 116 | 01110100 | 2366 |
| 117 | 01110101 | 2372 |
| 118 | 01110110 | 2378 |
| 119 | 01110111 | 2384 |
| 120 | 01111000 | 2390 |
| 121 | 01111001 | 2396 |
| 122 | 01111010 | 2402 |
| 123 | 01111011 | 2408 |
| 124 | 01111100 | 2414 |
| 125 | 01111101 | 2420 |
| 126 | 01111110 | 2426 |
| 127 | 01111111 | 2432 |
| 128 | 10000000 | 2438 |
| 129 | 10000001 | 2444 |
| 130 | 10000010 | 2450 |
| 131 | 10000011 | 2456 |
| 132 | 10000100 | 2462 |
| 133 | 10000101 | 2468 |
| 134 | 10000110 | 2474 |
| 135 | 10000111 | 2480 |
| 136 | 10001000 | 2486 |
| 137 | 10001001 | 2492 |
| 138 | 10001010 | 2498 |
| 139 | 10001011 | 2504 |
| 140 | 10001100 | 2510 |
| 141 | 10001101 | 2516 |
| 142 | 10001110 | 2522 |
| 143 | 10001111 | 2528 |
| 144 | 10010000 | 2534 |
| 145 | 10010001 | 2540 |
| 146 | 10010010 | 2546 |
| 147 | 10010011 | 2552 |
| 148 | 10010100 | 2558 |
| 149 | 10010101 | 2564 |
| 150 | 10010110 | 2570 |
| 151 | 10010111 | 2576 |
| 152 | 10011000 | 2582 |
| 153 | 10011001 | 2588 |
| 154 | 10011010 | 2594 |
| 155 | 10011011 | 2600 |
| 156 | 10011100 | 2606 |
| 157 | 10011101 | 2612 |
| 158 | 10011110 | 2618 |
| 159 | 10011111 | 2624 |
| 160 | 10100000 | 2630 |
| 161 | 10100001 | 2636 |
| 162 | 10100010 | 2642 |
| 163 | 10100011 | 2648 |
| 164 | 10100100 | 2654 |
| 165 | 10100101 | 2660 |
| 166 | 10100110 | 2666 |
| 167 | 10100111 | 2672 |
| 168 | 10101000 | 2678 |
| 169 | 10101001 | 2684 |
| 170 | 10101010 | 2690 |
| 171 | 10101011 | 2696 |
| 172 | 10101100 | 2702 |
| 173 | 10101101 | 2708 |
| 174 | 10101110 | 2714 |
| 175 | 10101111 | 2720 |
| 176 | 10110000 | 2726 |
| 177 | 10110001 | 2732 |
| 178 | 10110010 | 2738 |
| 179 | 10110011 | 2744 |
| 180 | 10110100 | 2750 |
| 181 | 10110101 | 2756 |
| 182 | 10110110 | 2762 |
| 183 | 10110111 | 2768 |
| 184 | 10111000 | 2774 |
| 185 | 10111001 | 2780 |
| 186 | 10111010 | 2786 |
| 187 | 10111011 | 2792 |
| 188 | 10111100 | 2798 |
| 189 | 10111101 | 2804 |
| 190 | 10111110 | 2810 |
| 191 | 10111111 | 2816 |

Digital Word - Frequency Assignment Table 1670–3200 Hz

| Decimal # Frequency | Binary Word | Frequency (Hz) |
|---|---|---|
| 192 | 11000000 | 2822 |
| 193 | 11000001 | 2828 |
| 194 | 11000010 | 2834 |
| 195 | 11000011 | 2840 |
| 196 | 11000100 | 2846 |
| 197 | 11000101 | 2852 |
| 198 | 11000110 | 2858 |
| 199 | 11000111 | 2864 |
| 200 | 11001000 | 2870 |
| 201 | 11001001 | 2876 |
| 202 | 11001010 | 2882 |
| 203 | 11001011 | 2888 |
| 204 | 11001100 | 2894 |
| 205 | 11001101 | 2900 |
| 206 | 11001110 | 2906 |
| 207 | 11001111 | 2912 |
| 208 | 11010000 | 2918 |
| 209 | 11010001 | 2924 |
| 210 | 11010010 | 2930 |
| 211 | 11010011 | 2936 |
| 212 | 11010100 | 2942 |
| 213 | 11010101 | 2948 |
| 214 | 11010110 | 2954 |
| 215 | 11010111 | 2960 |
| 216 | 11011000 | 2966 |
| 217 | 11011001 | 2972 |
| 218 | 11011010 | 2978 |
| 219 | 11011011 | 2984 |
| 220 | 11011100 | 2990 |
| 221 | 11011101 | 2996 |
| 222 | 11011110 | 3002 |
| 223 | 11011111 | 3008 |
| 224 | 11100000 | 3014 |
| 225 | 11100001 | 3020 |
| 226 | 11100010 | 3026 |
| 227 | 11100011 | 3032 |
| 228 | 11100100 | 3038 |
| 229 | 11100101 | 3044 |
| 230 | 11100110 | 3050 |
| 231 | 11100111 | 3056 |
| 232 | 11101000 | 3062 |
| 233 | 11101001 | 3068 |
| 234 | 11101010 | 3074 |
| 235 | 11101011 | 3080 |
| 236 | 11101100 | 3086 |
| 237 | 11101101 | 3092 |
| 238 | 11101110 | 3098 |
| 239 | 11101111 | 3104 |
| 240 | 11110000 | 3110 |
| 241 | 11110001 | 3116 |
| 242 | 11110010 | 3122 |
| 243 | 11110011 | 3128 |
| 244 | 11110100 | 3134 |
| 245 | 11110101 | 3140 |
| 246 | 11110110 | 3146 |
| 247 | 11110111 | 3152 |
| 248 | 11111000 | 3158 |
| 249 | 11111001 | 3164 |
| 250 | 11111010 | 3170 |
| 251 | 11111011 | 3176 |
| 252 | 11111100 | 3182 |
| 253 | 11111101 | 3188 |
| 254 | 11111110 | 3194 |
| 255 | 11111111 | 3200 |

With reference to FIGS. 1, 2 and 4, in operation, a digital signal 6 in the form of a digital stream, such as 01101011000000010001111000000011 . . . , is divided into individual 8 bit words, 01101011, 00000001, 00011110 and 00000011, respectively, by the first converter processor 7. The first converter processor 7 then assigns each digital word a corresponding frequency assignment according to the above conversion table. For example, the first converter processor 7 assigns frequency assignments 2312 Hz, 1676 Hz, 1850 Hz and 1688 Hz corresponding to the above digital words 01101011, 00000001, 00011110 and 00000011. An AF analog signal 13 is then created by the alternating frequency generator 11 in which the sinusoidal wave has a first cycle having a frequency of 2312 Hz, a second cycle having a frequency of 1676 Hz, a third cycle having a frequency of 1850 Hz, and a fourth cycle having a frequency of 1688 Hz. In this manner, 32 bits of digital data, instead of 4 bits of digital data, are transmitted in four cycles of the AF analog signal.

The AF analog signal 13 is then stored in memory 15 or transmitted by transmitter 17. To decompress the AF analog signal 13, the signal is sent to an alternating frequency measurement means 21. As shown in FIG. 4, the AF analog signal 13 is routed through a series of filter banks having a plurality of FIR filters. For example, the first cycle of the analog signal, at 2312 Hz, is routed through FIR filters 33$d$ and 35$k$ before reaching FIR filter 371. Upon reaching FIR filter 371, the FIR filter triggers the second converter processor 23 to produce digital word 01101011 decoded according to the above conversion table. Similarly, the second, third and fourth cycles of the analog signal (at 1676 Hz, 1850 Hz and 1688 Hz) are routed through FIR filters 33$a$ and 35$a$; 33$a$ and 35$h$; and 33$a$ and 35$a$ before reaching FIR filters 37$b$, 37$g$ and 37$d$, respectively. Upon reaching FIR filters 37$b$, 37$g$ and 37$d$, these FIR filters trigger the production of digital words 00000001, 00011110 and 00000011 by the second converter according to the above conversion table. These digital words are then sequentially arranged to recreate the original digital data stream 01101011000000010001111000000011. Assuming an average frequency of 2432 Hz, the present system provides a digital data transmission rate of 19,456 bits per second (bps), significantly greater than the 3200 bps capable of the public phone system without employing other compression methods.

As would be understood by those skilled in the art, digital signal 6 may be further compressed by reducing the bandwidth separation between frequency assignments, by decreasing the predetermined number of cycles before alternating the frequencies in the AF analog signal, and increasing the number of digital bits stored by each digital word. For example, it is preferred that the sampling rate of AF analog signal 13 be increased such that the alternating frequencies of the analog signal are altered every half cycle of the sinusoidal wave. With reference to FIG. 3, each half cycle provides a start and stop interception point 29 for determining the frequency of that portion of the analog signal corresponding to each digital word. Known techniques and apparatus in the art, such as use of the upcounter method, a frequency translator, the frequency counter method, and time interval analyzer, can then be employed to determine the frequency of each half cycle of the analog signal.

For additional embodiments of the preferred invention, multiple signals are sent on the same AF analog signal. In one embodiment, with reference to FIG. 3, a first digital data stream comprising digital words A, C, E and G are combined with a second digital data stream comprising digital words B, D, F and H. The digital streams are combined with alternate half cycles of the sinusoidal wave corresponding to digital words of the first or second digital signal. More particularly, when the first and second digital signals are combined, the first digital signal is separated into digital words which define only the positive waveforms of the AF analog signal, while the second digital stream is divided into digital words which define only the negative waveforms of an AF analog signal. To decompress the AF analog signal, the positive and negative waveforms are separated and the frequency assignments are translated back into digital words by the second convertor connected to the conversion table. Separate first and second digital streams are recreated by sequentially compiling the digital words according to whether they were originally a positive or negative waveform of the sinusoidal wave.

In additional preferred embodiments, conversion tables are generated so that frequently transmitted digital words define frequency assignments having shorter wavelengths to further increase the data compression rate. For example, with reference to the above conversion table, digital data predominated by "zeros" would have a slower data transmission rate than digital data predominated by "ones". Accordingly, in a preferred embodiment, the digital data is analyzed prior to compression in order to select, or create, an ideal conversion table for the compression of the digital data.

The selection of alternate conversion tables, also provides a simple method of encryption. By using proprietary conversion tables or by frequently changing the conversion tables, provides a simple and inexpensive method for encrypting the AF analog signal.

Furthermore, where the transmission of data needs not be lossless, for example for the transmission of video imagery, the bandwidth separation between frequency assignments can be reduced to the point where acceptable errors may be introduced into the system. For example, the transmission of video imagery including a 256 color scale requires 8 bits. Reduction of the bandwidth separation between frequency assignments of the above example from 6 Hz to 1 Hz significantly increases the data transmission rate by providing a corresponding increase in the average frequency. More particularly, the average frequency for the AF analog signal 13 is increased from 2432 Hz to 3072 Hz. Any error made by the alternating frequency measurement means 21 results in a diversion from the correct level in the 256 color scale which is imperceptible to the human eye.

Though the above described preferred embodiments have been made primarily with reference to the compression of digital data 6, analog data may also be compressed by application of the present invention. With reference to FIG. 1, analog data in the form of an analog signal 3 is converted into a digital signal 6 by an analog-to-digital converter 5. The digital signal 6 is then converted into an AF analog signal 13 by the first converter processor 7 and alternating frequency generator 11. To reproduce the original analog signal 3, the AF analog signal 13 is first converted back into a digital signal 6 by alternating frequency measurement means 21 connected to the second converter processor 23. The digital signal 6 is then converted to the original analog signal 3 by a standard digital-to-analog converter 25.

Where signal-to-noise ratio (S/N) is of concern for the transmission of the AF analog signal 13, for example for transmission by radio frequencies (RF), it is preferred that the AF analog signal 13 by delivered at a substantially maximum and constant amplitude. For example, FIGS. 2 and 3 show the AF analog signal 13 to have a constant amplitude. This is believed preferable for the transmission of high-speed digital data by cellular, wireless, infra-red transmitters or the like where spurious signals could distort measurements made by the alternating frequency measurement means 21.

Where signal-to-noise ratio (S/N) is not of concern for the transmission of the AF analog signal 13, it is believed that other known compression methods may be used in cooperation with application of the present invention to further compress analog or digital data 6. For example, known methods of adjusting the amplitude, known as Amplitude Modulation (AM), may be combined with the practice of the present invention to transmit data at an even faster rate. For example, modulating the amplitude of the AF analog signal 13 during signal transmission provides the ability to transmit additional data, or data more quickly, than simply by alternating the frequency of the AF analog signal.

Where the transmission of data needs not be lossless, for example during the transmission of video imagery, lossy compression methods may also be combined with the practice of the present invention. The combination of known lossy methods with the production of an AF analog signal 13 of the present invention can be determined without undo experimentation by those skilled in the art.

Though particular forms of the invention have been illustrated and described, it will be apparent that various modifications can be made without departing from the spirit and scope of the invention. Accordingly, it is not intended that the invention be limited, except for the appended claims. Having described the invention in such terms as to enable those skilled in the art to make and use it, and having identified the presently preferred best modes thereof, I claim:

I claim:

1. A system for compressing digital data, comprising:
   a processor for receiving digital words and assigning frequencies to the digital words, wherein each digital word uniquely corresponds to an assigned frequency; and
   a frequency generator for generating a signal having alternating frequencies corresponding to the assigned frequencies, wherein, for each assigned frequency, the frequency generator generates the signal for a predetermined number of cycles of the assigned frequency.

2. The system of claim 1, wherein the processor assigns frequencies to the digital words according to a lookup table.

3. The system of claim 2, wherein the signal has a constant amplitude.

4. The system of claim 2, wherein the predetermined number of cycles is one cycle.

5. The system of claim 4, wherein the predetermined number of cycles is one-half cycle.

6. A system for decompressing digital data from an analog signal that alternates its frequency every predetermined number of cycles, comprising:
   a frequency detector for receiving the analog signal and detecting, for each duration of the predetermined number of cycles, the assigned frequency of the analog signal, and
   a processor for determining a digital word corresponding to the detected assigned frequency.

7. The system of claim 6, wherein the frequency detector comprises a plurality of Finite Impulse Response (FIR) filters, each FIR filter corresponding to an assigned frequency.

8. The system of claim 7, wherein the predetermined number of cycles is one cycle.

9. The system of claim 8, wherein the predetermined number of cycles is one-half cycle.

10. A method of compressing digital data comprising:
    providing a set of digital words and a corresponding set of frequency assignments, each frequency assignment corresponding uniquely to a digital word;

receiving a digital word from the set of digital words;

assigning the corresponding frequency to the received digital word; and generating a sinusoid at the assigned frequency for a predetermined number of cycles of the assigned frequency.

11. The method of claim 10, wherein the predetermined number of cycles is one cycle.

12. The method of claim 10, wherein the predetermined number of cycles is one-half cycle.

* * * * *